(12) United States Patent
Tekulve et al.

(10) Patent No.: US 6,655,429 B2
(45) Date of Patent: Dec. 2, 2003

(54) SAW MILL WITH APPARATUS FOR GUIDING A BOARD AND METHOD FOR USE THEREOF

(75) Inventors: Daniel R. Tekulve, Batesville, IN (US); Scott Laskowski, Madisonville, KY (US)

(73) Assignee: Wood-Mizer Products, Inc., Indianapolis, IN (US)

(*) Notice: Subject to any disclaimer, the term of this patent is extended or adjusted under 35 U.S.C. 154(b) by 0 days.

(21) Appl. No.: 10/205,984

(22) Filed: Jul. 26, 2002

(65) Prior Publication Data

US 2003/0145906 A1 Aug. 7, 2003

Related U.S. Application Data

(60) Provisional application No. 60/353,309, filed on Feb. 1, 2002.

(51) Int. Cl.$^7$ ............................. B27B 1/00; B27B 31/00; B23D 55/08
(52) U.S. Cl. ............................. 144/378; 83/109; 83/150; 83/794; 83/801; 83/813; 144/242.1; 144/245.1; 144/245.7
(58) Field of Search ........................... 83/109, 147, 150, 83/794, 797, 801, 803, 813; 144/378, 242.1, 245.1, 245.6, 245.7; 414/751.1, 753.1

(56) References Cited

U.S. PATENT DOCUMENTS

| 4,289,180 A | * | 9/1981 | Weinzierl | 144/378 |
| 4,559,858 A | * | 12/1985 | Laskowski et al. | 83/801 |
| 5,035,166 A | * | 7/1991 | Carlson et al. | 83/801 |

* cited by examiner

Primary Examiner—W. Donald Bray
(74) Attorney, Agent, or Firm—Woodward, Emhardt, Moriarty, McNett & Henry LLP (57) ABSTRACT

A saw mill includes a base frame having a front and a rear and being sized and configured to support a log; saw apparatus having a cutting blade and being connected with the base frame for horizontal movement in a cutting stroke from a start position near the front of the base frame to an end position near the rear of the base frame and in a return stroke back to the front of the base frame and being for cutting in a generally horizontal plane a board from the log; power apparatus for powering the saw apparatus; at least one pushback arm connected to the saw apparatus and being sized and configured to engage and eject the board from atop the log during the return stroke; and, a board guide apparatus extending generally forwardly from the saw apparatus and including a crossbar and plurality of fingers connected with the crossbar and positioned to engage and guide the board in a desired path as it is being ejected from the log, each finger including an upper link connected to the crossbar and a lower link hingedly connected with the upper link.

9 Claims, 11 Drawing Sheets

SAW MILL WITH APPARATUS FOR GUIDING A BOARD AND METHOD FOR USE THEREOF

CROSS-REFERENCE RELATED TO APPLICATION

The present application claims the benefit of U.S. Provisional Application Serial No. 60/353,309, filed Feb. 1, 2002, which is incorporated herein by reference.

FIELD OF THE INVENTION

The present invention relates to the field of saw mills, and more particularly to a saw mill with apparatus for controlling the position of the board being cut during and after the sawing action.

BACKGROUND OF THE INVENTION

In certain portable saw mills, logs are located upon a bed and a head carrying a continuous saw blade is moved along the log to cut a board. As the cutting head returns to the start position, a return member projecting from the cutting head ejects the cut board off the cant (remainder of the log). Certain factors such as the length of the log, frictional variations in the wood and the extent to which the sawblade is away from level can all combine to cause the freshly cut board to be ejected in an off-axis path—that is, be ejected off to one side instead of longitudinally off the underlying log. Severe variations in the ejected board path can, at the least, make it awkward and difficult to retrieve and stack the boards, or worse could jam the cutting head.

What is needed is mechanism to ensure that the board stays in the desired path during ejection.

SUMMARY OF THE INVENTION

Generally speaking, apparatus is provided for sawing lumber and more particularly to a portable saw mill with apparatus for controlling the position of the board being cut during and after the sawing action.

A saw mill includes a base frame having a front and a rear and being sized and configured to support a log; saw apparatus having a cutting blade and being connected with the base frame for horizontal movement in a cutting stroke from a start position near the front of the base frame to an end position near the rear of the base frame and in a return stroke back to the front of the base frame and being for cutting in a generally horizontal plane a board from the log; power apparatus for powering the saw apparatus; at least one pushback arm connected to the saw apparatus and being sized and configured to engage and eject the board from atop the log during the return stroke; and, a board guide apparatus extending generally forwardly from the saw apparatus and including a crossbar and plurality of fingers connected with the crossbar and positioned to engage and guide the board in a desired path as it is being ejected from the log, each finger including an upper link connected to the crossbar and a lower link hingedly connected with the upper link.

It is an object of the present invention to provide an improved portable saw mill.

Further objects and advantages will become apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, and that any alterations or modifications in the illustrated device, and any further applications of the principles of the invention as illustrated therein are contemplated as would normally occur to one skilled in the art to which the invention relates.

The present invention relates to a device in a portable saw mill for guiding a board as it is being cut and as it is being ejected. While the device described herein is for use with a portable saw mill, alternative embodiments are contemplated for use in a variety of workpiece ejection applications. The portable band saw shown and described herein is of the type for cutting boards of varying desired thicknesses from a log, such type of portable band saw being shown and described in U.S. Pat. No. 4,559,858, that patent and the subject matter of which is hereby incorporated by reference.

Figure 1:
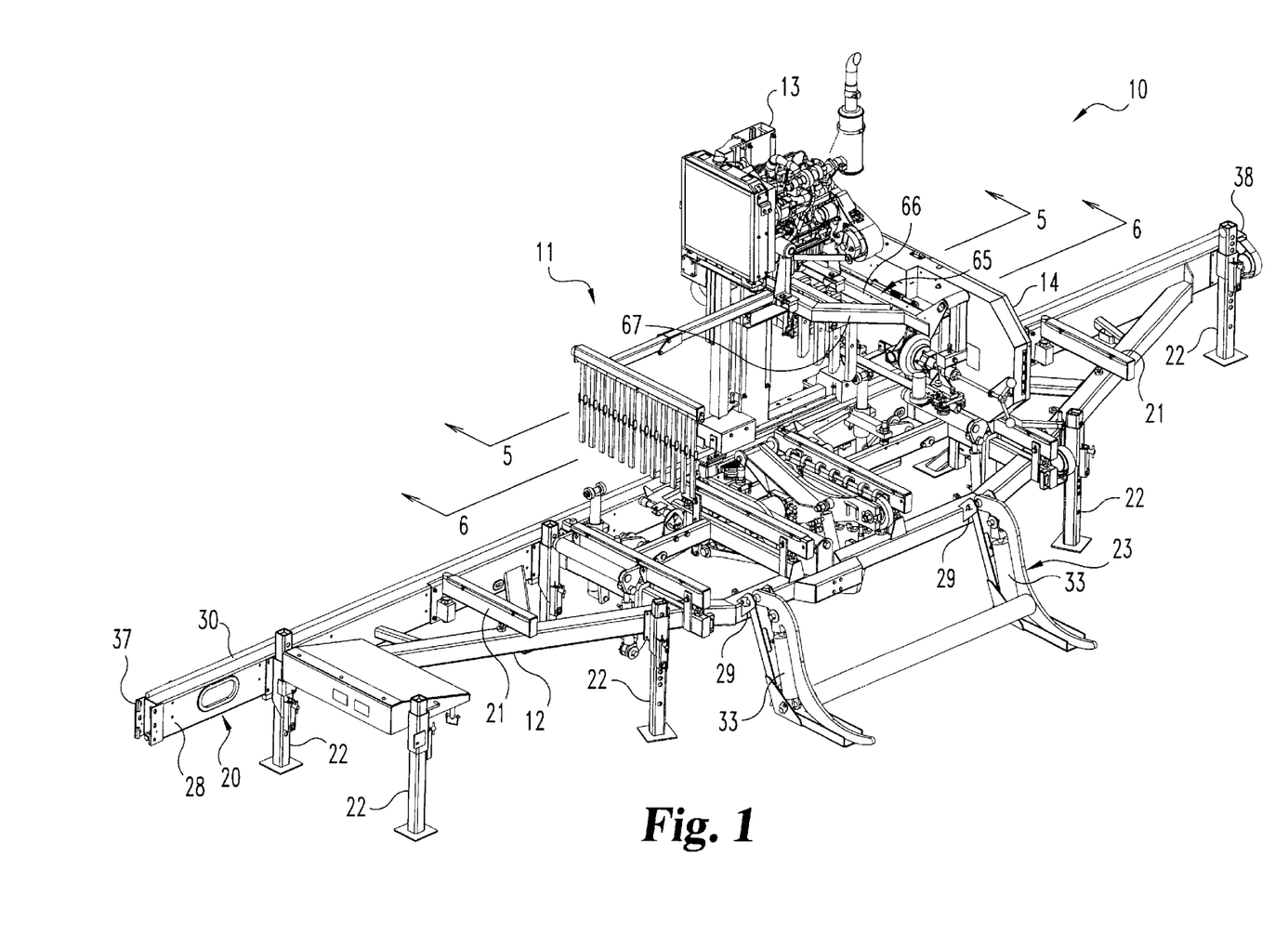
FIG. 1 is a front, outside, perspective view of a portable saw mill 10 with an apparatus 11 for guiding the position of the board being cut both during and after the sawing action.
Figure 2:
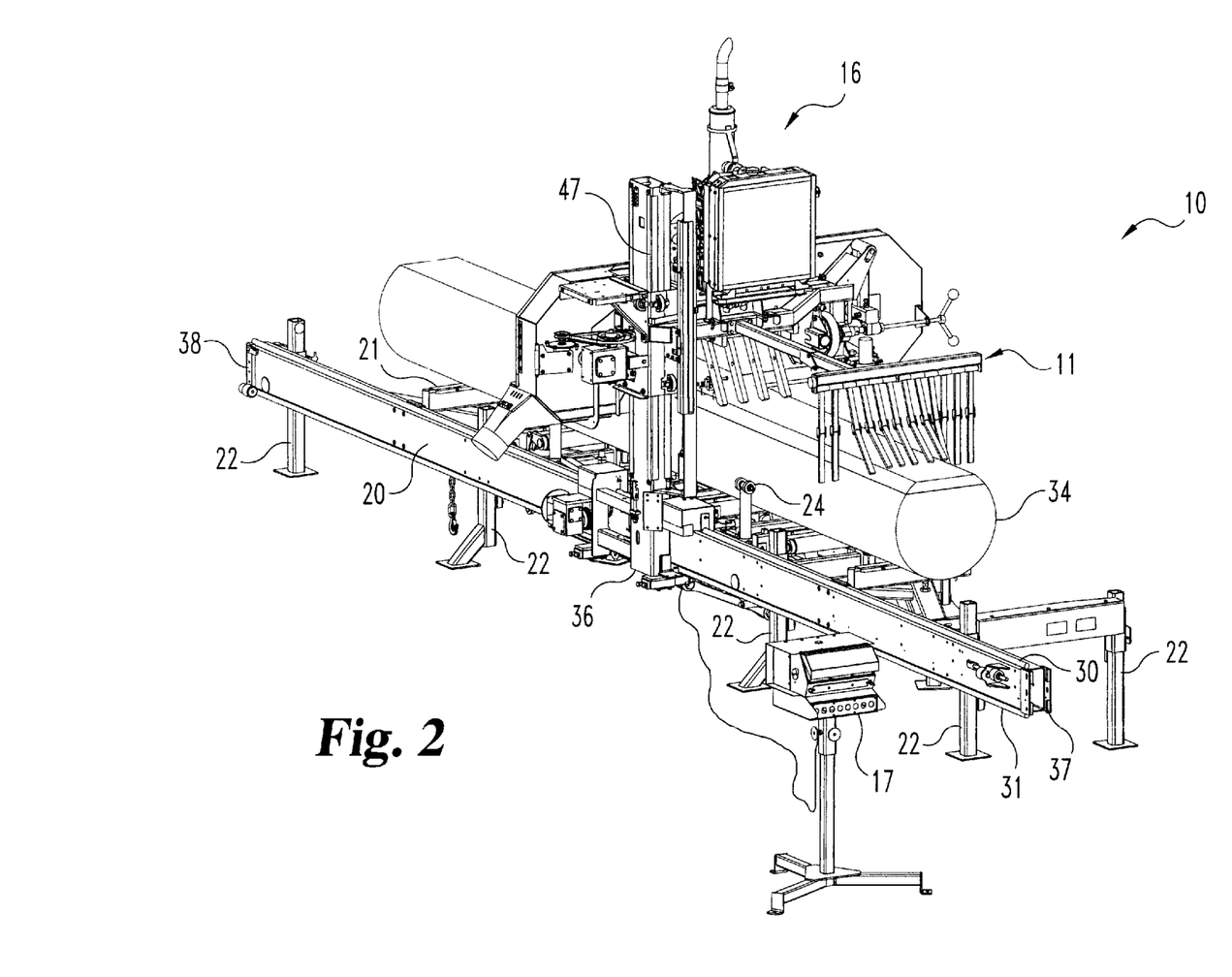
FIG. 2 is a front, inside, perspective view of the portable saw mill 10 with apparatus 11 of FIG. 1 and shown midway through cutting a board 84 from log 34.

Referring to FIGS. 1–2, there is shown a portable saw mill 10 with an apparatus 11 for guiding a board in accordance with the preferred embodiment of the present invention. Saw mill 10 generally includes a base frame 12, a mast 13, a band saw 14, board guide apparatus 11, a power unit 16 and a control console 17.

Base frame 12 generally includes a unitized tubular track 20, a plurality of log supporting bed rails 21, ground engaging outriggers 22, a hydraulically actuated log loading arm 23, log stop(s) 24 and various auxiliary reinforcement rails. These base frame parts are attached to each other by appropriate means such as welding and are fabricated from steel tubing to provide rigidity and twist resistance. In one embodiment, unitized track 20 is fabricated from 4"×8"×24' long structural tubing 28 with 1" diameter hardened steel rods 30 and 31 welded to the top and bottom of the structural tubing 28. These dimensions are for example only and may be changed as necessary. Other structural elements and features of base frame 12 are provided as necessary and desired, are known and are described and shown in U.S. Pat. No. 4,559,858, which as been incorporated herein by reference.

There are seven outriggers 22, each telescopically connected to base frame 12. Each outrigger can thus be adjusted vertically to provide level and stable positioning of saw mill 10 on an uneven surface. Base frame 12 is also provided with means (not shown) to attach an axle and wheels to facilitate movement of the saw mill. Log loading arm 23 is pivotally attached along a horizontal axis to base frame 12 at a pair of opposing hinge points 29. A log is positioned on arm 23 and hydraulic actuators 33 pivot the arm 23 and the log thereupon up and on top of bed rails 21. Arm 23 can then be pivoted back down to its rest position, ready to receive another log (as shown in FIG. 1). Actuation of log loading arm 23, along with control of all the other powered elements of band saw 10, are controlled by a user from control console 17. Alternative means for loading a log onto bed rails 21 are also contemplated, such as ramp members (not shown) leading at an angle down from base frame 12 to the ground, such ramp members being positioned to permit a log to be manually rolled up onto the bed rails 21. Once positioned on top of bed rails 21, the log 34 is locked into place by appropriate mechanisms such as log stops 24 and clamps 27 (one shown).

In a manner similar to the carriage 4 of U.S. Pat. No. 4,559,858, mast 13 is connected at its lower end 36 (see FIG. 2) to roll on rollers along unitized tubular track 20 and its hardened steel rods 30 and 31 from a start position near the front end 37 of base frame 12 to an end position near the rear end 38 of base frame 12. A driving mechanism (not shown) in the base section (at 36) of mast 13, driven by power unit 16, moves mast 13 along track 20 and under the control of console 17.

Figure 4:
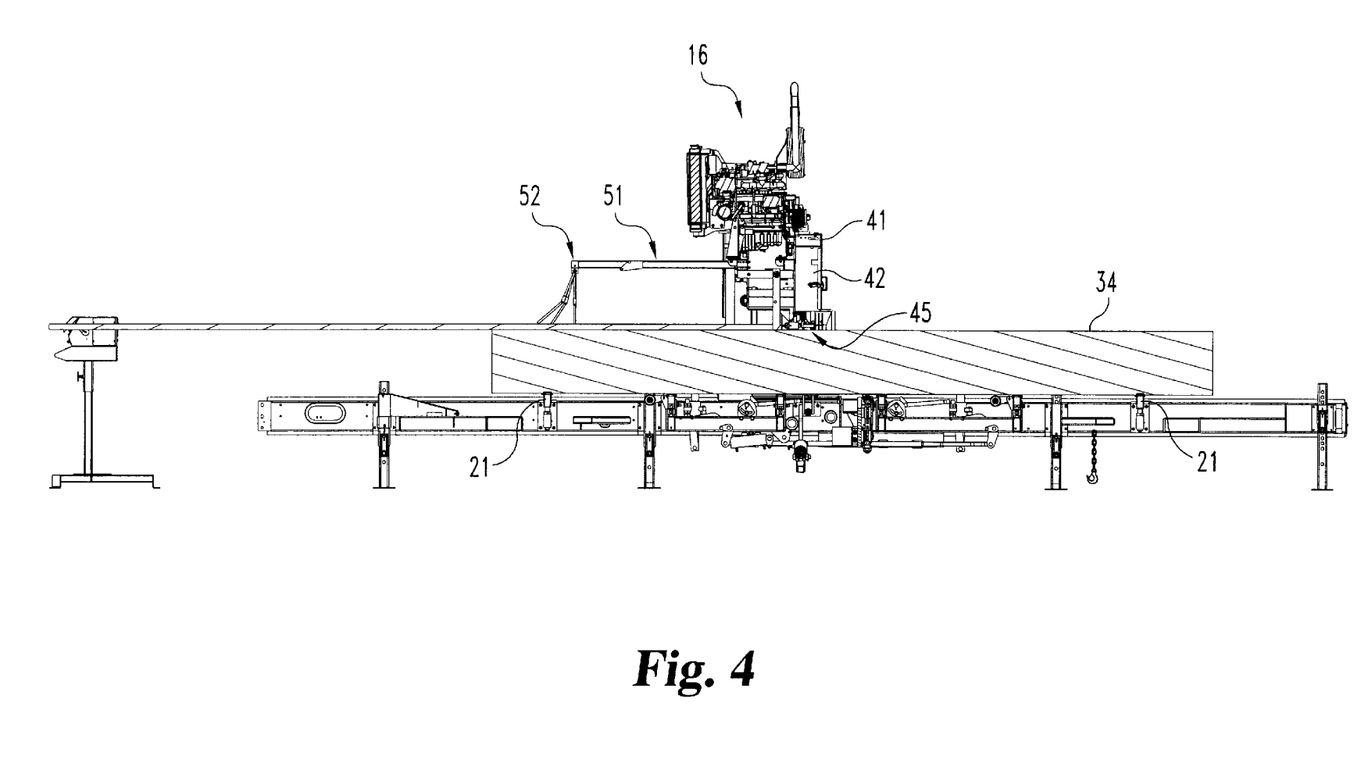
FIG. 4 is a side, elevational and cross-sectional view of the portable saw mill 10 with apparatus 11 of FIG. 3 taken along the lines 4—4 and viewed in the direction of the arrows.
Figure 5:
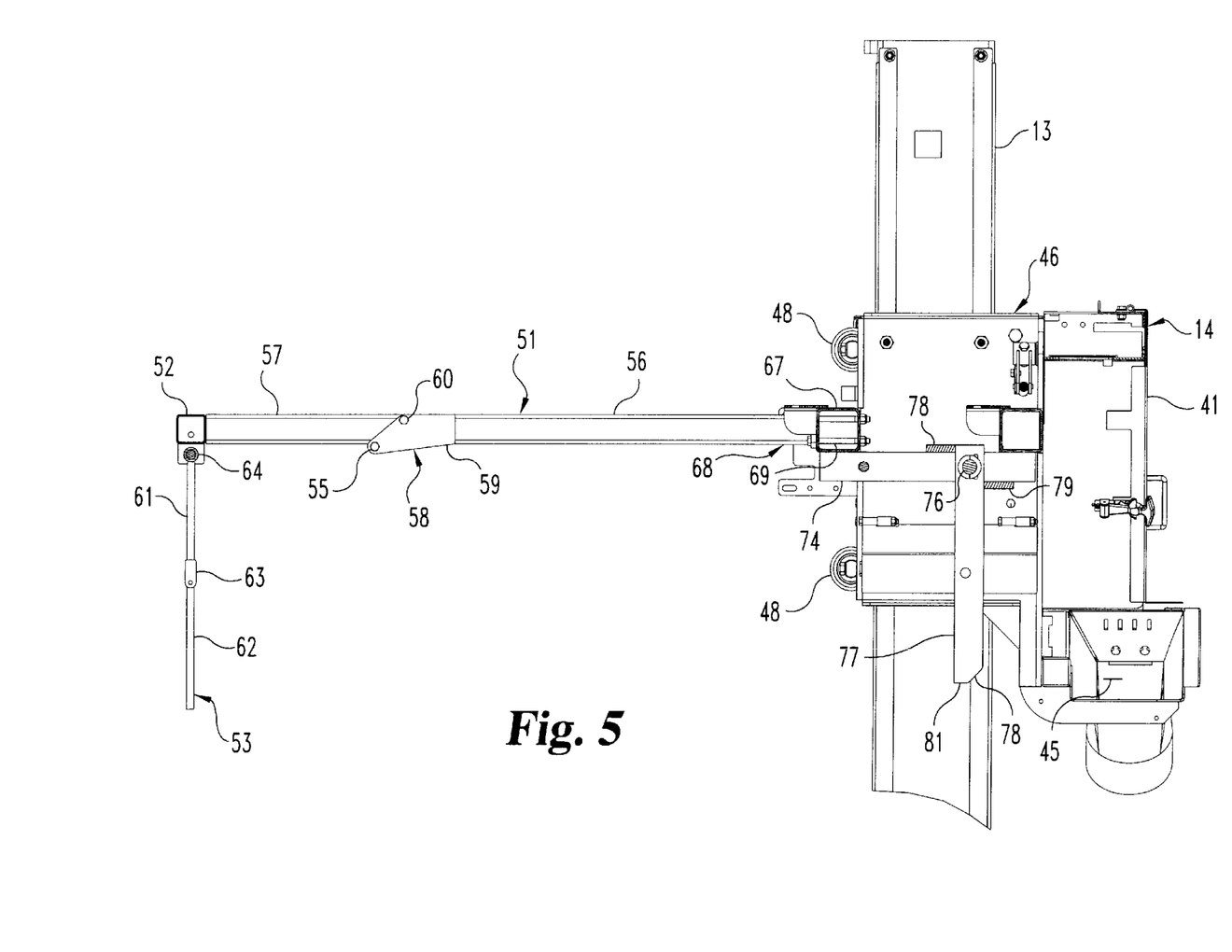
FIG. 5 is an enlarged, side, elevational and cross-sectional view of the apparatus 11 for guiding a board, the mast 13 and the band saw 14 of FIG. 1 taken along the lines 5—5 and viewed in the direction of the arrows.

Referring to FIGS. 1, 4 and 5, band saw 14 generally includes a housing 41, a band saw blade mechanism 42, and a band saw lift mechanism 43. As in U.S. Pat. No. 4,559,858 incorporated herein by reference, the band saw blade mechanism 43 is mounted to and generally within housing 41 and includes a continuous blade 45 wrapped around a pair of spaced-apart band saw wheels and ultimately driven by power unit 16. Housing 41 includes a mast sleeve 46 sized and configured to surround and engage with mast 13 for cantilevered support thereon and vertical movement relative thereto. The term cantilevered is used herein to indicate that band saw 14 is mounted via mast 13 to unitized track 20 on only one side of the log to be cut. Sleeve 46 telescopically surrounds mast 13 and includes rollers 48 inside sleeve 46 that engage with wear strips 47 on the outside of mast 13 so that sleeve 46 and its band saw 14 can be moved up and down by appropriate mechanical means. In the present embodiment, such mechanical means includes a chain (not shown) fixed at the top and bottom of mast 13, and mating, powerdriven sprockets rotatably mounted to sleeve 46.

Referring to FIGS. 1–5, board guide apparatus 11 includes a cantilevered support arm 51, a dragback crossbar 52 and a plurality of dragback fingers 53. Support arm 51 includes an inboard arm 56, an outboard arm 57, and a limit hinge 58. Limit hinge 58 includes a hinge bracket 59, a pivot pin 60 and a limit pin 55. Hinge bracket 59 is fixedly connected to the outboard end of inboard arm 56, and outboard arm 57 is hingedly connected to hinge bracket 59 by pin 60. Limit pin 55 is positioned in hinge bracket 59 such that outboard arm 57 is pivotable about pin 60 from an operation position (as shown in FIG. 5) whereby arms 56 and 57 are substantially collinear, to a non-use position folded up on top of inboard arm 56. Outboard arm 57 is constrained from pivoting any further counterclockwise about pin 60 by limit pin 55. Each dragback finger 53 includes an upper link 61 and a lower link 62 that is hingedly connected at its upper end to the lower end of upper link 61 by a link hinge 63. In one embodiment, each link hinge 63 is fixed to the lower end of its upper link by appropriate means such as welding, and the corresponding lower link 62 is connected to its link hinge 63 by a pin 54. The upper end of each upper link 61 is hingedly connected to dragback crossbar 52 by a common hinge pin 64 that is supported at its opposing ends through holes in opposing ends 71 and 72 of dragback crossbar 52 and is supported in the middle of crossbar 52 at central support 70.

A laterally extending, Y-shaped bracket 65 includes a straight, rear bracket member 66 and a front bracket member 67 that angles forwardly from rear bracket member 65, and then parallel thereto to connect with sleeve 46. Rear bracket member 66 lies next to and is connected to housing 41. The inboard end 68 of support arm 51 is fixedly connected by appropriate means such as bolts 69 to front bracket member 67. In one embodiment, dragback crossbar 52 is approximately 34 inches wide and has 12 dragback fingers 53 hingedly depending therefrom in substantially evenly spaced relation between the opposing ends 71 and 72. The width of dragback crossbar 52, the number and placement of the fingers 53 along the crossbar 52, and the positionment of board guide apparatus 11 relative to its mounting to front bracket member 67 are preferably made to ensure that, with the largest log 34 saw mill 10 can receive positioned on base frame 12, there will always be at least one dragback finger 53 hanging along either side of the log 34.

Figure 6:
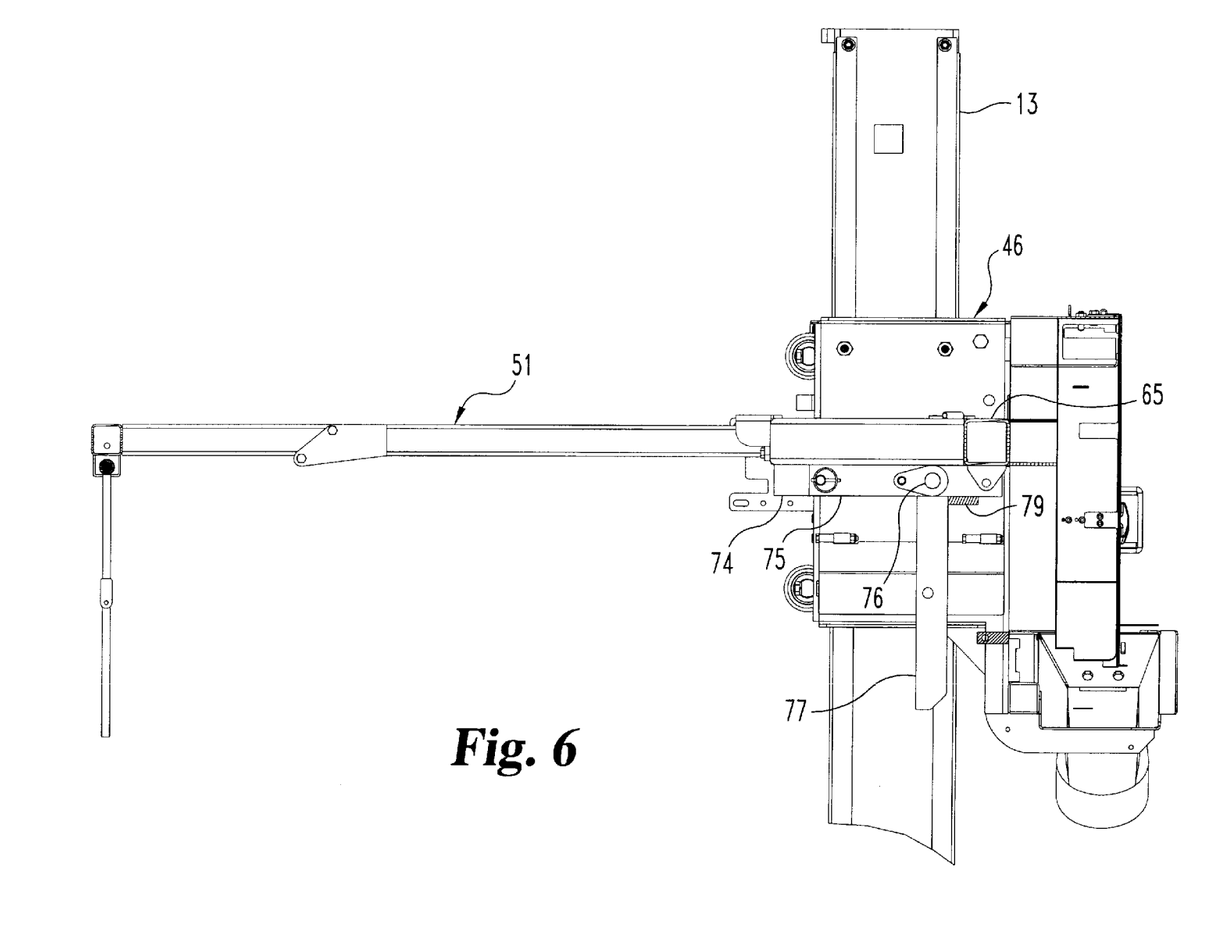
FIG. 6 is an enlarged, side, elevational and cross-sectional view of the apparatus 11 for guiding a board, the mast 13 and the band saw 14 of FIG. 1 taken along the lines 6—6 and viewed in the direction of the arrows.
Figure 7:
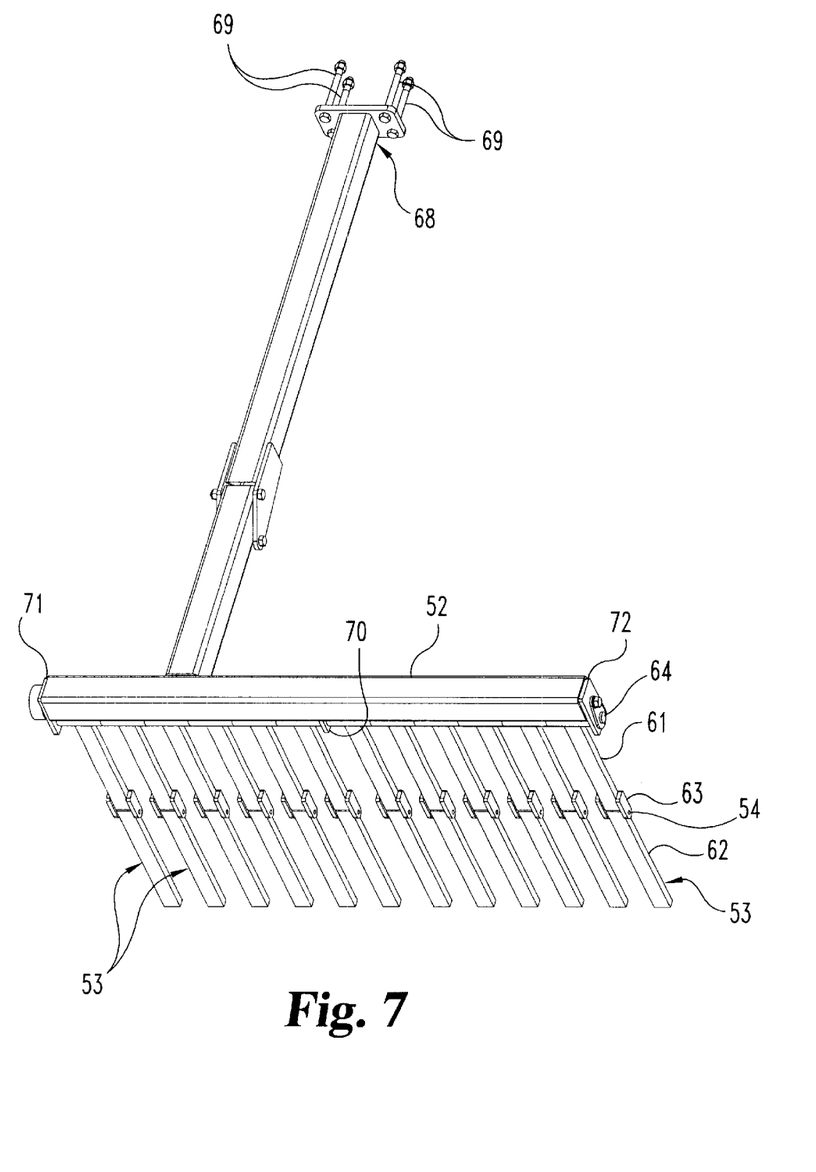
FIG. 7 is a front, outside, perspective view of the apparatus for guiding a board 11 of FIG. 1.

Referring to FIGS. 1, 5 and 6, a pair of parallel and opposing pushback support brackets 74 and 75 are mounted to the underside of Y-shaped bracket 65. A hinge pin 76 is supported at its opposing ends by support brackets 74 and 75 such that the axis of hinge pin 76 is generally perpendicular to the axis of a log 34 received by saw mill 10. A plurality of pushback arms 77 are pivotally supported by hinge pin 76. Each pushback arm 77 is generally rectangular shaped, as shown in FIG. 4, except that its lower, rearward corner is chamfered at 78. As shown in FIGS. 5 and 6, each pushback arm 77 may hang straight down from pin 76 and rotate freely clockwise therefrom. Each pushback arm 77 is constrained from rotating counterclockwise, however, by upper and lower limit bars 78 and 79. Each bar 78 and 79 extends across both pushback support brackets 74 and 75 in the positions shown in FIG. 5 such that pushback arms 77 engage with limit bars 78 and 79 to prevent rotation any further counterclockwise than is shown.

Figure 3:
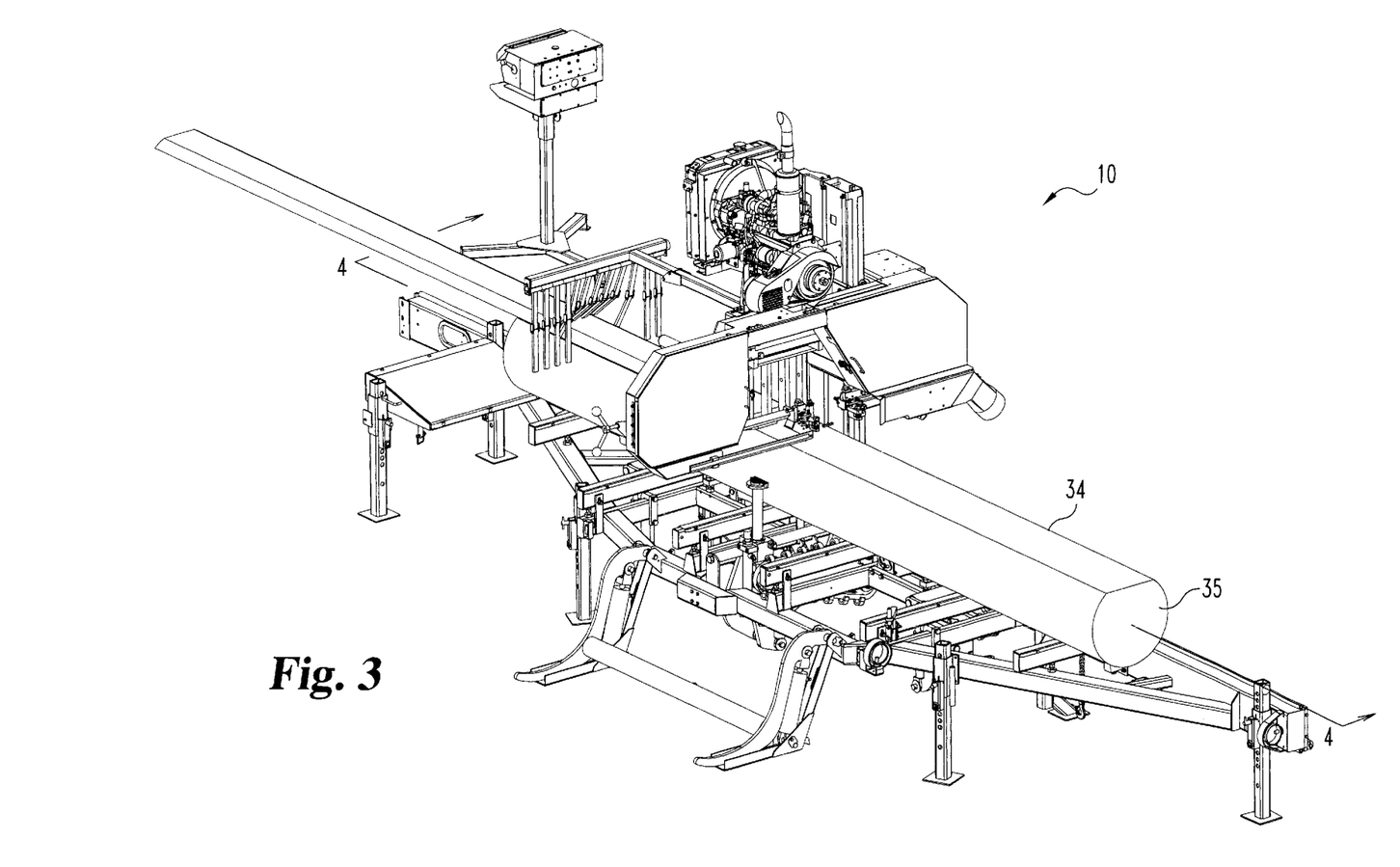
FIG. 3 is a rear, outside, perspective view of the portable saw mill 10 with apparatus 11 of FIG. 1 and shown midway through the return stroke ejecting a cut board 84 off the log 34.

The length of pushback arms 77 are selected so that, when arms 77 hang freely straight down (as shown in FIG. 3), the bottom edges 81 of the arms 77 are just higher than the band saw cutting blade 45.

Figure 8:
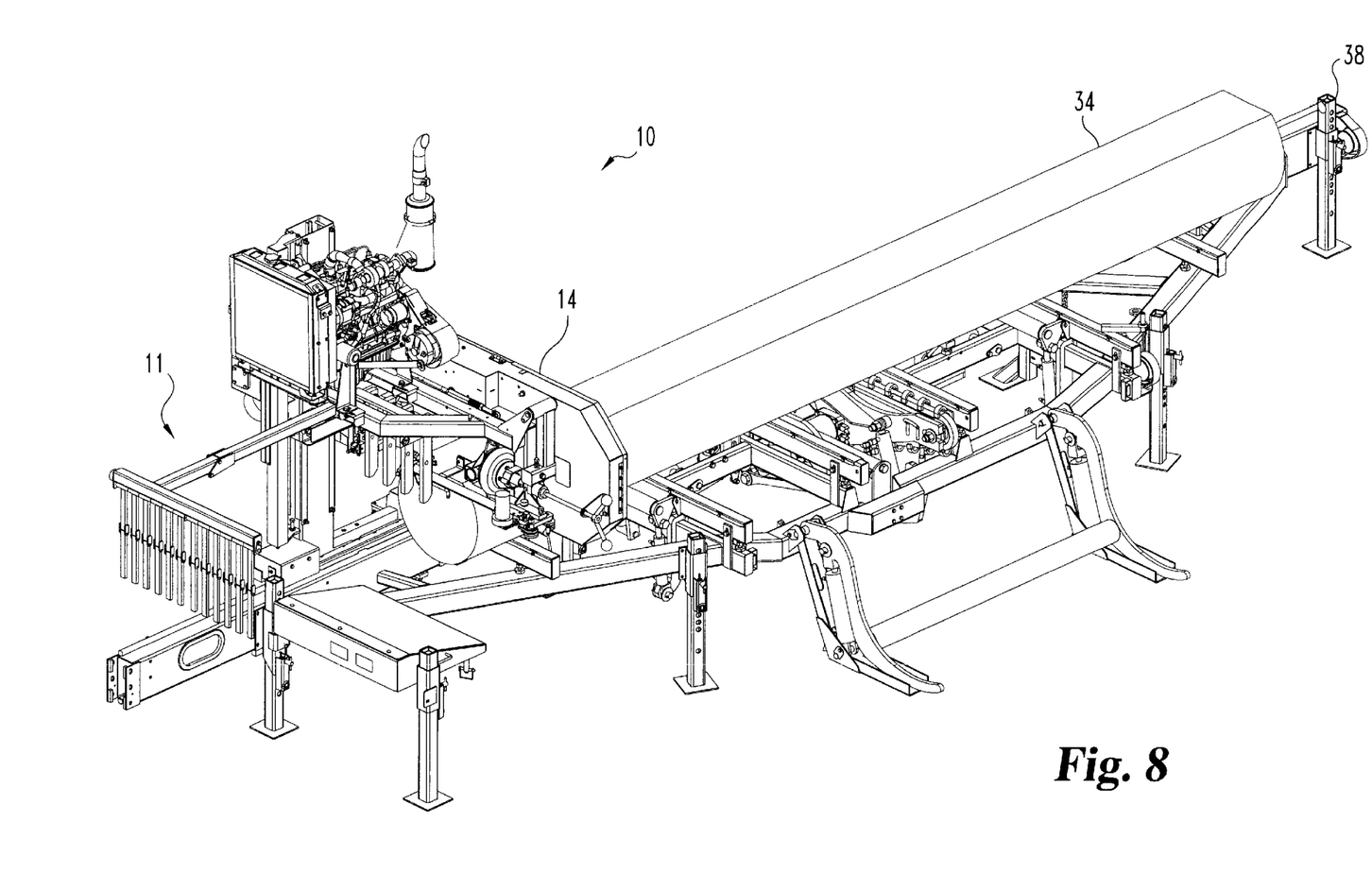
FIG. 8 is a front, outside, perspective view of the portable saw mill 10 with apparatus 11 of FIG. 1 and shown with a log 34 loaded and ready to be cut.
Figure 9:
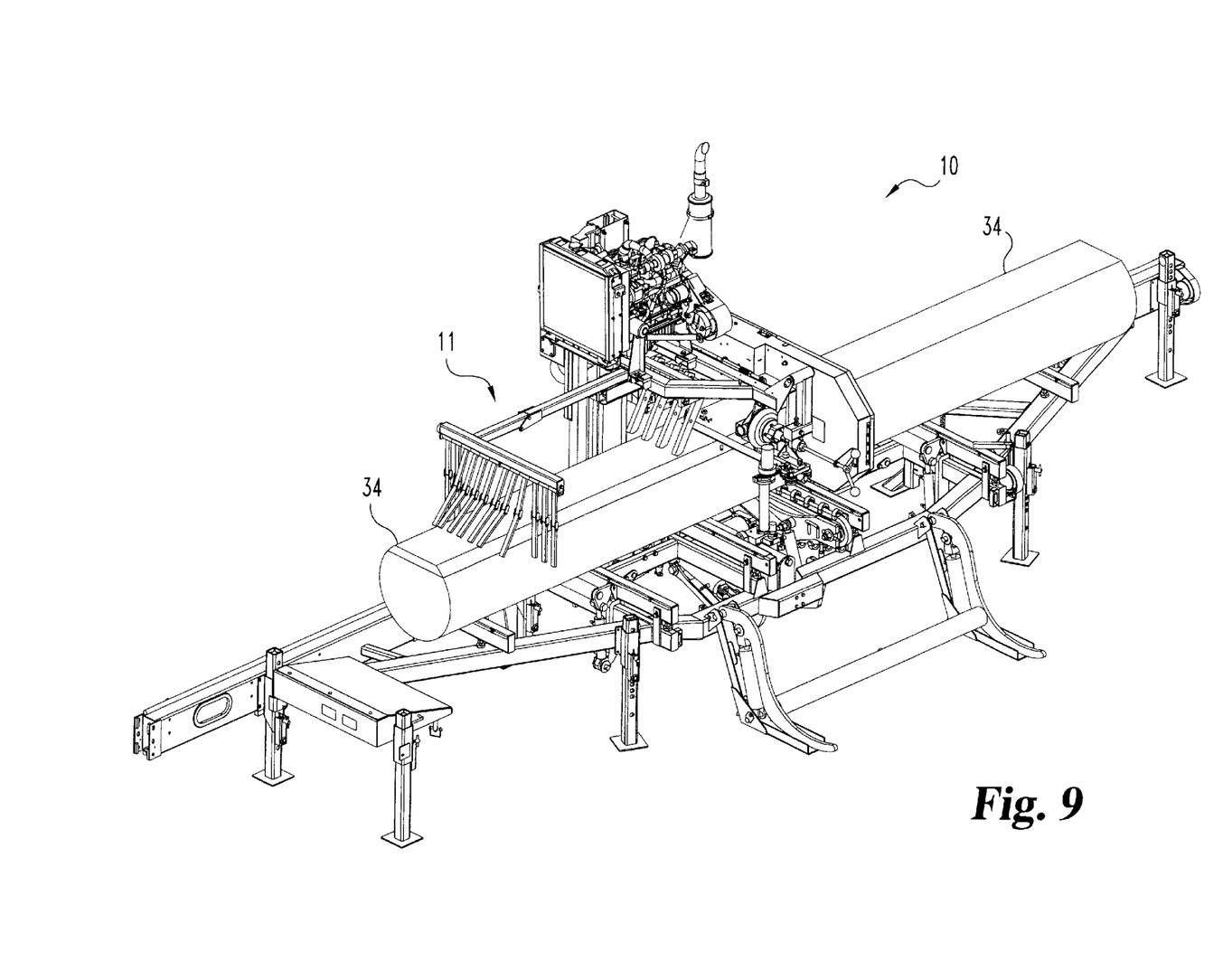
FIG. 9 is a front, outside, perspective view of the portable saw mill 10 with apparatus 11 of FIG. 1 and shown midway through cutting a board 84 from log 34.
Figure 10:
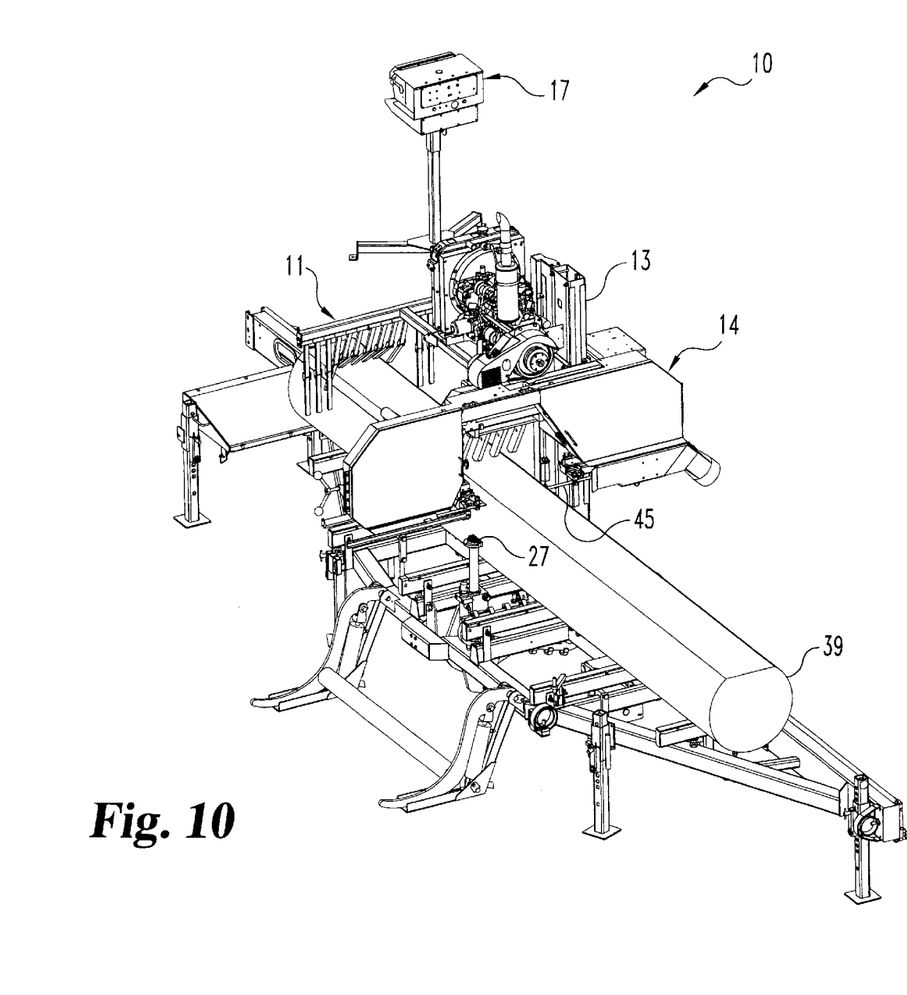
FIG. 10 is a rear, outside, perspective view of the portable saw mill 10 with apparatus 11 of FIG. 1 and shown midway through cutting a board 84 from log 34.
Figure 11:
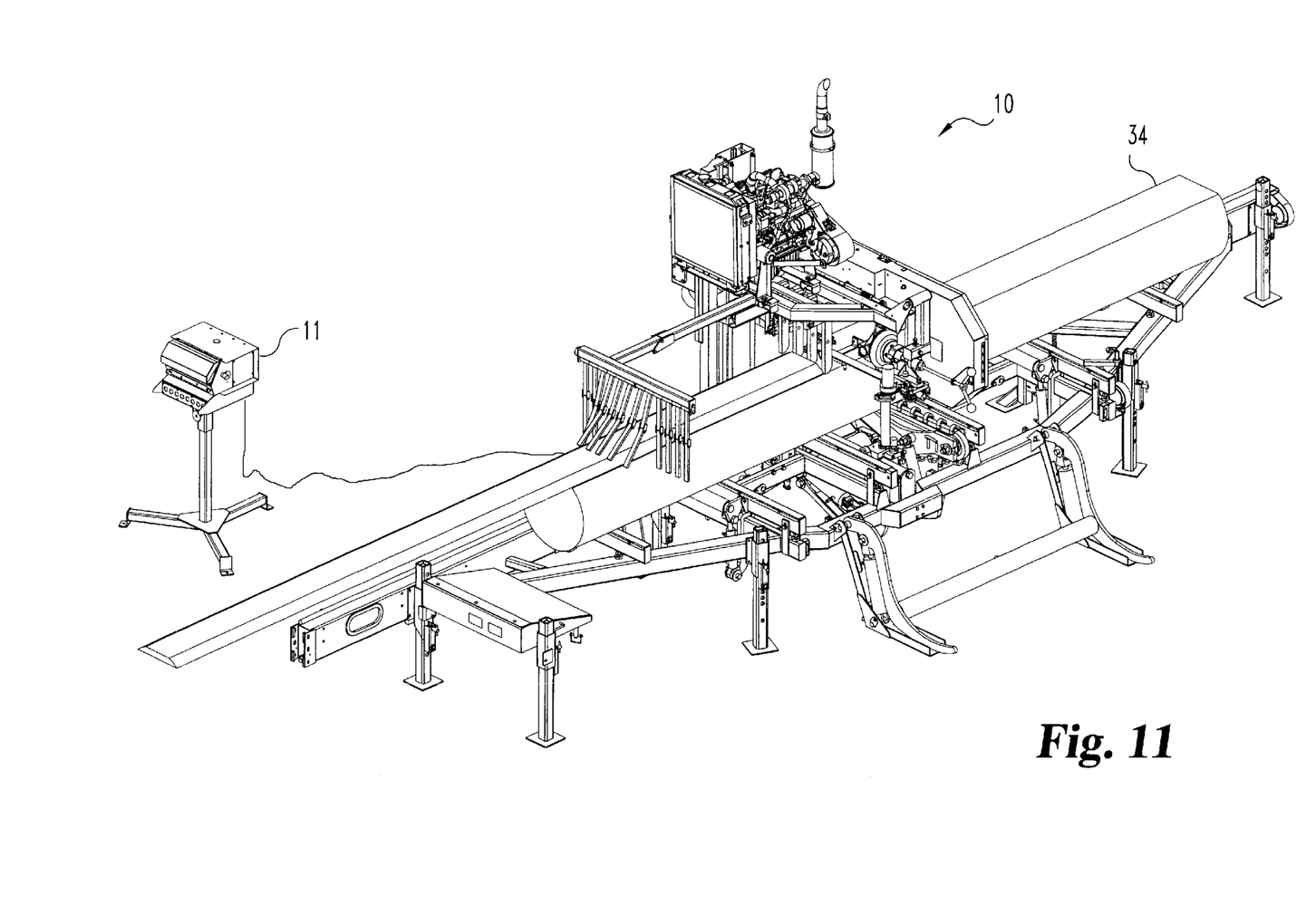
FIG. 11 is a front, outside, perspective view of the portable saw mill 10 with apparatus 11 of FIG. 1 and shown midway through the return stroke ejecting the cut board 84 off the log 34.

In operation, boards of varying thickness may be cut from a log 34 by setting the height of band saw 14 before each cut. With band saw 14 moved proximal to the front end of saw mill 10, a log 34 is positioned atop base frame 12 and held thereat by log stops 24 (FIG. 8.). Band saw 14 is then raised or lowered along mast 13 to the desired position relative to log 34, and band saw 14 is advanced toward rear end 38 of saw mill 10. As band saw advances toward the rear end 38 and begins to cut a board 84, both pushback arms 77 and dragback fingers 53 engage the front end of the board 84 and log 34 and pivot about their respective pivot pins 76 and 63 and 65, respectively, as shown in FIGS. 9 and 10. When band saw 14 reaches and passes the rear end 85 of log 34, board 84 has been completely severed from the remainder of log 34 and rests atop log 34. Band saw 14 is advanced far enough past log 34 so that pushback arms 77 completely clear log 34 and board 84 and will then hang straight down. Band saw 14 is then returned toward the front of saw mill 10, and pushback arms 77 engage with newly cut board 84. Because pushback arms 77 hang down to a lower limit that is just above blade 45 (See FIGS. 4 and 5), pushback arms 77 engage with newly cut board 84, but do not engage with log 34. As band saw 14 is continually advanced toward the front end, board 84 is pushed forwardly and, once band saw 14 reaches the front end of log 34, board 84 is completely ejected from saw mill 10.

During the entire cutting and ejection process, dragback fingers 53 hang down and many engage with log 34. Since fingers 53 are only pivotable along a transverse axis—perpendicular to the axis of log 34—any force acting to move board 84 laterally will result in board 84 quickly coming in lateral contact with one of the dragback fingers 53. Since fingers 53 are constrained from pivoting laterally, board 84 is thus limited from any further movement laterally. The number and spacing of dragback fingers 53 contributes in large part to the degree of movement board 84 can have both during the cutting action and the ejection action.

The saw mill 10 of the present invention has been described as portable. The apparatus 11 for guiding a board is contemplated for use in saw mills that are not portable, as well.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. A saw mill, comprising:
    a base frame having a front and a rear and being sized and configured to support a log;
    saw means having a cutting blade and being connected with said base frame for horizontal movement in a cutting stroke from a start position near the front of said base frame to an end position near the rear of said base frame and in a return stroke back to the front of said base frame and being for cutting in a generally horizontal plane a board from the log;
    power means for powering said saw means;
    at least one pushback arm connected to said saw means and being sized and configured to engage and eject the board from atop the log during the return stroke; and,
    a board guide apparatus extending generally forwardly from said saw means and including a crossbar and plurality of fingers connected with the crossbar and positioned to engage and guide the board in a desired path as it is being ejected from the log, each finger including an upper link connected to the crossbar and a lower link hingedly connected with the upper link.

2. The saw mill of claim 1 wherein said plurality of fingers includes 12 fingers spaced along the crossbar.

3. The saw mill of claim 1 wherein said base frame includes a track and said saw means includes a mast having a lower end connected for sliding movement along the track, said saw means further including a band saw connected for vertical movement along the mast, and wherein the crossbar includes a support arm extending fowardly from the band saw.

4. The saw mill of claim 3 wherein the support arm includes an inboard arm connected to the band saw and an outboard end hingedly connected to the inboard arm.

5. A method for sawing lumber, comprising the steps of:
    providing a saw mill including:
        a base frame having a front and a rear and being sized and configured to support a log,
        saw means having a continuous cutting blade and being connected with said base frame for horizontal movement in a cutting stroke from a start position near the front of said base frame to an end position near the rear of said base frame and in a return stroke back to the front of said base frame and being for cutting in a generally horizontal plane a board from the log,
        power means for powering said saw means,
        at least one pushback arm extending downwardly from said saw means, and wherein each of said at least one pushback arms has a bottom end, and
        a board guide apparatus extending generally forwardly from said saw means and forwardly of said at least one pushback arm and including a crossbar and plurality of fingers hingedly connected to hang downwardly from the crossbar, each finger including an upper link connected to the crossbar and a lower link hingedly connected with the upper link, and each finger hanging in a rest position to a point lower than the generally horizontal plane of the cutting blade;
    positioning a log atop said base frame, the log having a forward and a rearward end;
    moving one of the cutting blade and the log vertically to position the cutting blade at a desired cutting height relative to the forward end of the log;
    cutting a board by activating said saw means to move the cutting blade through the cutting stroke until the blade clears the rearward end of the log and completely severs the board from the log and until said at least one pushback arm clears the rearward end of the log and board, the board having a rearward end;
    ejecting the board by activating said saw means to move the cutting blade through the return stroke whereby said at least one pushback arm engages the rearward end of the board and pushes it forwardly and off the log.

6. The method for sawing lumber of claim 5 wherein said providing a saw mill step includes the saw means including a band saw sized to saw a board from a log having a maximum width and further includes the fingers of the board guide apparatus being spaced through an outer width where there can always be at least one finger hanging along either side of the log.

7. The method for sawing lumber of claim 6 wherein said providing a saw mill step includes said plurality of fingers including 12 fingers spaced along the crossbar.

8. The method for sawing lumber of claim 6 wherein said providing a saw mill step includes the base frame including a track and the saw means including a mast having a lower end connected for sliding movement along the track, the band saw being connected for vertical movement along the mast, and wherein the crossbar includes a support arm extending fowardly from the band saw.

9. The method for sawing lumber of claim 8 wherein said providing a saw mill step includes the support arm including an inboard arm connected to the band saw and an outboard end hingedly connected to the inboard arm.

* * * * *